United States Patent
Maiga et al.

(10) Patent No.: US 12,261,965 B2
(45) Date of Patent: Mar. 25, 2025

(54) DECENTRALIZED IDENTITY-BASED ACCESS CONTROL SYSTEMS AND METHODS

(71) Applicant: PassiveBolt, Inc., Ann Arbor, MI (US)

(72) Inventors: Kabir Zachary Maiga, Canton, MI (US); Philip Michael Johnson, Ann Arbor, MI (US); Simon Forster, Ann Arbor, MI (US)

(73) Assignee: PassiveBolt, Inc., Ann Arbor, MI (US)

( * ) Notice: Subject to any disclaimer, the term of this patent is extended or adjusted under 35 U.S.C. 154(b) by 0 days.

(21) Appl. No.: 18/425,433

(22) Filed: Jan. 29, 2024

(65) Prior Publication Data

US 2024/0259214 A1 Aug. 1, 2024

Related U.S. Application Data

(60) Provisional application No. 63/482,020, filed on Jan. 27, 2023.

(51) Int. Cl.
*H04L 9/32* (2006.01)
*H04L 9/30* (2006.01)

(52) U.S. Cl.
CPC .......... *H04L 9/3247* (2013.01); *H04L 9/3073* (2013.01)

(58) Field of Classification Search
None
See application file for complete search history.

(56) References Cited

U.S. PATENT DOCUMENTS

| | | | | |
|---|---|---|---|---|
| 7,366,677 | B1 * | 4/2008 | Liu | G06Q 10/02 709/204 |
| 8,042,163 | B1 * | 10/2011 | Karr | G06F 3/062 726/8 |
| 8,949,609 | B2 * | 2/2015 | Teranishi | H04L 9/3218 713/168 |
| 10,437,977 | B2 * | 10/2019 | Lambert | H04W 12/082 |
| 2004/0128508 | A1 * | 7/2004 | Wheeler | H04L 63/0442 713/176 |
| 2013/0024060 | A1 * | 1/2013 | Sukkarie | H04L 67/12 701/22 |

(Continued)

OTHER PUBLICATIONS

International Search Report for Application No. PCT/US2024/013348; mailed May 29, 2024; 3 pp.

*Primary Examiner* — Kambiz Zand
*Assistant Examiner* — Mahabub S Ahmed
(74) *Attorney, Agent, or Firm* — Bodman PLC

(57) ABSTRACT

An electronic access key system includes an access device. The access device is configured to receive an electronic access key from a presenter computing system of a presenter and control access to a physical space. The electronic access key was previously digitally signed by an issuer computing system of an issuer associated with the access device by generating a digital signature using a private key of the issuer, which is of a cryptographic key pair that also includes a public key. The access device stores the public key of the issuer associated therewith prior to receiving the electronic access key from the presenter computing system. Upon receiving the electronic access key, access device verifies the electronic access key with the public key of the issuer and denies the presenter access to the physical space if the electronic access key is not verified.

11 Claims, 10 Drawing Sheets

(56) References Cited

U.S. PATENT DOCUMENTS

| | | | | |
|---|---|---|---|---|
| 2013/0179005 | A1* | 7/2013 | Nishimoto | B60R 25/1001 |
| | | | | 701/2 |
| 2017/0236343 | A1* | 8/2017 | Leboeuf | G07C 9/20 |
| | | | | 340/5.61 |
| 2017/0334395 | A1* | 11/2017 | Lu | B60R 25/24 |
| 2017/0352214 | A1* | 12/2017 | Maiwand | G07C 9/00896 |
| 2018/0167394 | A1* | 6/2018 | High | H04L 63/123 |
| 2018/0190051 | A1* | 7/2018 | Outwater | H04L 63/0823 |
| 2019/0092279 | A1* | 3/2019 | Jarvis | H04L 9/3297 |
| 2019/0096021 | A1* | 3/2019 | Jarvis | G07F 17/0057 |
| 2019/0305962 | A1* | 10/2019 | Takemori | H04L 9/3234 |
| 2020/0062216 | A1* | 2/2020 | Fogelklou | H04W 12/069 |
| 2020/0099522 | A1* | 3/2020 | Yang | H04L 9/3226 |
| 2020/0213137 | A1* | 7/2020 | Zhang | H04L 9/14 |
| 2020/0361335 | A1* | 11/2020 | Penilla | B60R 25/01 |
| 2021/0143995 | A1* | 5/2021 | Baek | H04L 9/3239 |
| 2021/0273819 | A1* | 9/2021 | Rueckriemen | G06F 16/2379 |
| 2021/0273931 | A1* | 9/2021 | Murdoch | H04L 9/3239 |
| 2021/0319116 | A1* | 10/2021 | Jarvis | G16H 10/60 |
| 2021/0351920 | A1* | 11/2021 | Tang | G07C 9/00309 |
| 2021/0383378 | A1* | 12/2021 | McCoy | G06Q 20/38215 |
| 2022/0116231 | A1* | 4/2022 | Choi | H04L 9/3247 |
| 2022/0209946 | A1* | 6/2022 | Simon | H04W 12/04 |
| 2022/0231862 | A1* | 7/2022 | Chen | H04W 12/0471 |
| 2022/0392286 | A1* | 12/2022 | Elrad | H04W 12/041 |
| 2023/0299981 | A1* | 9/2023 | Zacher | H04L 9/3273 |
| | | | | 713/169 |
| 2023/0327883 | A1* | 10/2023 | Ansari | G06F 21/57 |
| | | | | 713/2 |
| 2023/0396443 | A1* | 12/2023 | O'Dwyer | H04L 9/3239 |
| 2023/0412400 | A1* | 12/2023 | Fürstner | H04L 63/0853 |

\* cited by examiner

DECENTRALIZED IDENTITY-BASED ACCESS CONTROL SYSTEMS AND METHODS

CROSS-REFERENCE TO RELATED APPLICATION(S)

This application claims priority to and the benefit of U.S. Patent Application No. 63/482,020, filed Jan. 27, 2023, and having the title ELECTRONIC KEY SYSTEM FOR PHYSICAL SPACES, the entire disclosure of which is incorporated by reference herein.

TECHNICAL FIELD

This disclosure relates to access control to physical spaces and, in particular, systems and devices using electronic access keys and digital signatures.

BACKGROUND

Smart locks and other electronic access control devices utilize credentials or various forms of electronic access keys to permit presenters access to physical spaces. However, such systems typically require those parties controlling the electronic access devices and/or issuing the electronic access keys to store personal identifying information of the presenters.

SUMMARY

Disclosed herein are implementations of electronic access key systems, access devices thereof, and methods therefor.

In an implementation, an electronic access key system includes an access device. The access device is configured to receive an electronic access key from a presenter computing system of a presenter and control access to a physical space. The electronic access key was previously digitally signed by an issuer computing system of an issuer associated with the access device by generating a digital signature using a private key of the issuer, which is of a cryptographic key pair that also includes a public key. The access device stores the public key of the issuer associated therewith prior to receiving the electronic access key from the presenter computing system. Upon receiving the electronic access key, access device verifies the electronic access key with the public key of the issuer and denies the presenter access to the physical space if the electronic access key is not verified.

The access device may verify the electronic access key by verifying, with the public key of the issuer, that the electronic access key was digitally signed with the private key of the issuer. The access device may verify the digital signature of the electronic access key to verify that the electronic access key was issued by the issuer associated with the access device and is untampered. The electronic access key may have been previously issued to a recipient having another public key, and the access device may further verify that the presenter of the electronic access key is the recipient with the public key of the recipient and may deny the presenter access to the physical space if the presenter is not verified to be the recipient.

The presenter may have another private key, and the presenter computing system may generate a digital signature of the presenter with the private key of the presenter and send the digital signature of the presenter to the access device. The access device may have received from the presenter computing system the digital signature of the presenter, the electronic access key may include the public key of the recipient, and the access device may verify that the presenter is the recipient by verifying the digital signature of the presenter with the public key of the recipient. The presenter may be verified to be the recipient if the other private key of the presenter and the other public key of the recipient form another cryptographic key pair of the recipient.

The electronic access key may include a key identifier uniquely associated with the electronic access key, the access device may store prior to receiving the electronic access key a list of revoked key identifiers associated with other electronic access keys that have been revoked by the issuer, the access device may verify that the electronic access key has not been revoked by the issuer by comparing the key identifier of the electronic access key to the list of revoked key identifiers, and/or the access device may deny the presenter access to the physical space if the electronic access key is not verified to have not been revoked.

The electronic access key may include access rights that include an identified physical space and a timeframe in which a recipient of the electronic access key is permitted to access the physical space, and the access device may deny the presenter access to the physical space if one or both of the identified physical space does not match the physical space associated with the access device or the timeframe does not include a current time.

The electronic access key system may further include a blockchain computing system, the issuer computing system associated with the issuer, and/or the presenter computing system. The issuer and the presenter may each have a digital identity that is a set of information that includes a party identifier, a private key, and a public key that form a cryptographic key pair with the private key and may also have a public digital identity that includes the party identifier and the public key. The blockchain computing system may store in a blockchain the public digital identities of the issuer and the presenter, and the blockchain may be accessible by the issuer computing system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
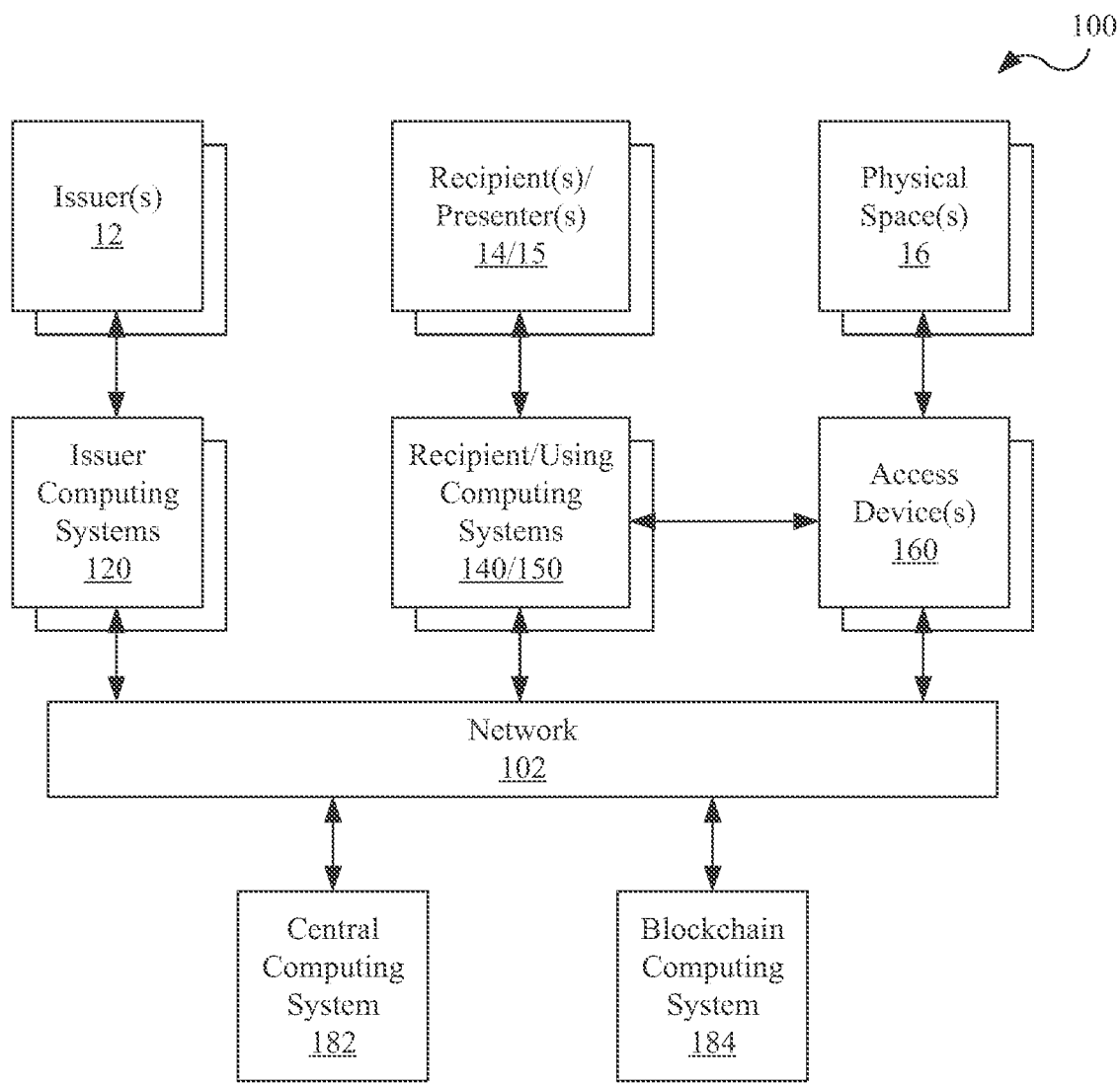
FIG. 1 is a schematic view of an electronic access key system.

Referring to FIG. 1, an electronic access key system 100 is configured for issuers 12 to issue electronic access keys to recipients 14 to gain access to physical spaces 16 controlled by the issuers 12. The electronic access key system 100 and variations there of may also be referred to as a decentralized identity-based access control systems, and the methods performed therewith may also be referred to as the decentralized identity-based access control methods. As discussed in further detail below, the electronic access key system 100 utilizes a blockchain and digital signatures to verify that the electronic access keys are untampered and issued by the issuer 12 and/or the presenters 15 presenting the electronic access key are the recipients 14 of the electronic access key. The electronic access key system further assesses the validity of the access rights (e.g., access rights have not been revoked and match the recipient 14, the space 16, and/or the current time). The space 16 is a physical space, such as a room or set of rooms within a building.

The issuers 12 are those parties that issue the electronic access keys to the recipients 14. The electronic access keys may also be referred to as an attestation or an access attestation. The recipients 14 are those parties to which the electronic access keys are issued by the issuers 12. Presenters 15 are those parties seeking access to the spaces 16 by electronically presenting the electronic access keys. If the electronic access key is determined to be valid and the presenter 15 determined to be the recipient 14 of the electronic access key, the presenter 15 is granted access to the space 16. The issuers 12, the recipients 14, and the presenters 15 may be persons or organizations (e.g., legal entities or other groups of persons). The issuers 12, the recipients 14, and the presenters 15 may be more generally referred to as parties. Furthermore, it should be understood that parties may have the role of the issuer 12, the recipient 14, and the presenter 15 in different contexts. For example, the presenter 15 may be the recipient 14 of the electronic access key that is valid and, when verified as such, be granted access to the space 16. Thus, in FIGS. 1 and 5, the recipient 14, the presenter 15, and their respective computing systems are depicted as common blocks.

Still referring to FIG. 1, the electronic access key system 100 generally includes party computing systems 110 associated with the issuers 12 and the recipients 14, access devices 160 associated with the physical spaces 16 and the issuers 12, one or more central computing systems 182, and a blockchain computing system 184, which are in communication with each other directly or via a network 102 (e.g., the cloud). The party computing systems 110 associated with the issuers 12, the recipients 14, and the presenters 15 may be more specifically referred to as issuer computing systems 120, recipient computing systems 140, and presenter computing systems 150.

Figure 2:
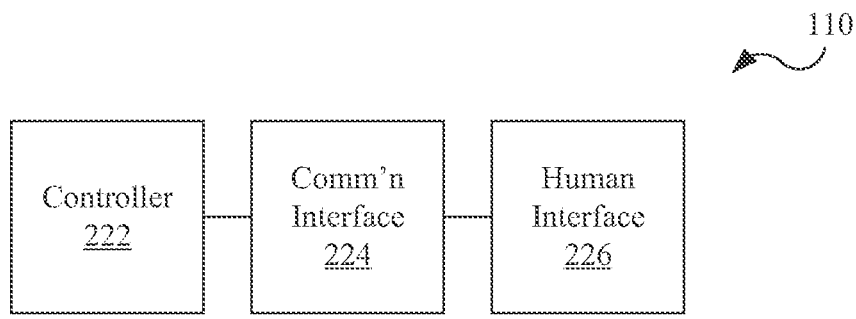
FIG. 2 is a schematic view of a party computing system of the electronic access key system.

Referring to FIG. 2, the party computing systems 110 include one or more computing devices, each of which may generally include a controller 222, a communications interface 224, and a human interface 226. The controller 222 is configured to execute instructions to provide the functionality described herein and may have a hardware configuration as described below with respect to FIG. 3 or any other suitable configuration. The communications interface 224 is configured to be in communication with other aspects of the electronic access key system 100, directly or indirectly (e.g., via the network 102) to send and receive information therebetween, and includes any suitable hardware (e.g. modems, radios) that are configured to communicate via any suitable protocols. The human interface 226 is configured to provide outputs to and receive inputs from humans (e.g., the issuer 12, the recipient 14, or the presenter 15), for example, including audio-visual outputs (e.g., screens and/or speakers) and various inputs (e.g., keyboard, mouse or touch pad, touch screen, microphones, cameras). The recipient computing systems 140 and the presenter computing systems 150 are preferably configured as mobile devices that are portable to communicate directly with the access devices 160 associated with different ones of the physical spaces 16.

Figure 3:
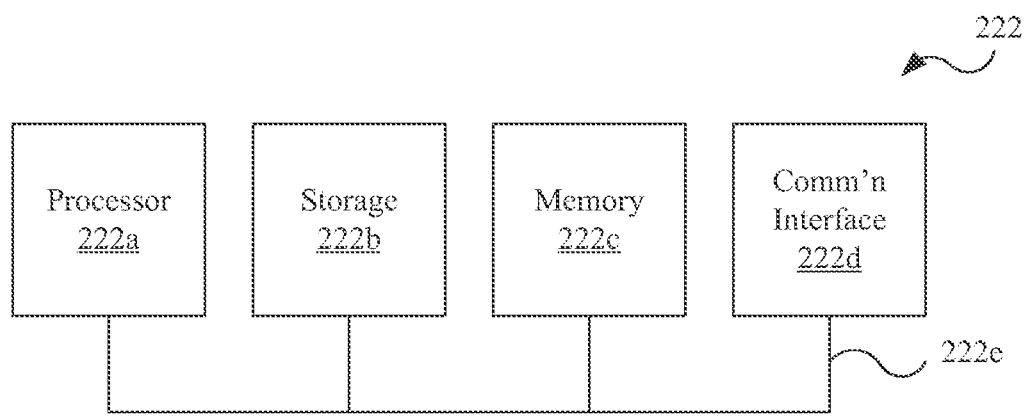
FIG. 3 is a schematic view of an example hardware configuration of a controller of the party computing system.

Referring to FIG. 3, the controller 222 generally includes a processor 222a, a storage 222b, a memory 222c, a communications interface 222d, and a bus 222e by which the other components of the controller 210 are in communication with each other. The processor 222a may be any suitable processing device, such as a central processing unit (CPU), configured execute the stored instructions. The storage 222b is a non-volatile, long-term storage device, such as a hard disc or solid state storage device capable of storing the instructions executed to be executed by the processor 222a (e.g., software programming) and other information and data. The storage 222b may be considered a non-transitory machine- or computer-readable medium. The memory 222c is a short term, volatile storage device, such as a random access memory (RAM) module. The communications interface 222d is configured to send signals from and receive signals to the controller 222 from other components of the devices or systems into which the controller 222 is incorporated.

Figure 4:
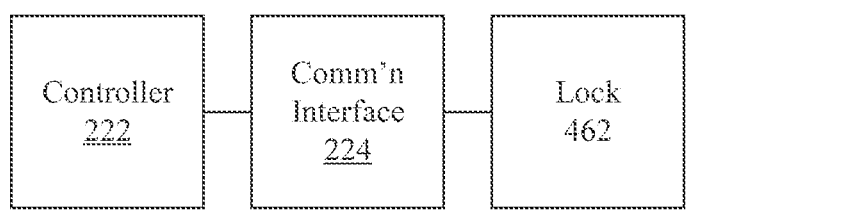
FIG. 4 is a schematic view of an access device.

Referring to FIG. 4, the access devices 160 are each configured to control access to the physical space 16 associated therewith. Each of the access devices 160 is associated with one of the issuers 12 and controlled thereby (e.g., via the issuer computing system 120) and includes, stored thereby, a public key 610c of the issuer 12. The access device 160 generally includes a controller 222 and a communications interface 224 (e.g., as described previously for the party devices) and a lock 462, directly or indirectly, operated by the controller 222. The lock 462 may be any type of electronically-operated lock physically associated with other hardware, such as a door, gate, elevator, or turnstile, that prevents access to the physical space 16 when locked and permits access to the physical space 16 when unlocked. For example, the lock 462 may include a bolt or pin that is retractable with via a solenoid or motor or include a magnetic to operably selectively release (i.e., lock and unlock) the lock 462. In one example, the controller 222 may directly control operation of the lock 462, for example, sending a signal (e.g., a voltage) directly to the lock 462 for operation thereof (e.g., to open or lock). In another example, the controller 222 may indirectly control operation of the lock 462, for example, by sending a signal containing information (e.g., a pass code) according to which another control system (e.g., computing device) then sends a signal (e.g., the voltage) directly to the lock for operation thereof.

Referring again to FIG. 1, the central computing system 182 includes one or more computing devices, centrally-located or distributed, that are individually and/or cooperatively configured to provide various of the functions as described here. Each of the computing devices of the central computing system 182 may, for example, be a cloud or server computing device that generally includes the controller 222 and the communications interface 224 similar to those described for the party computing system 110.

The blockchain computing system 184 is configured to store information in one or more blockchains and includes multiple computing devices (e.g., cloud or server computing devices) that operate as nodes that, by consensus, add, modify, and/or delete information from a distributed ledger that forms the blockchain. As discussed in further detail below, the blockchain computing system 184 is configured to store public digital identities 610' of different parties and/or devices of the electronic access key system 100.

Figure 5:
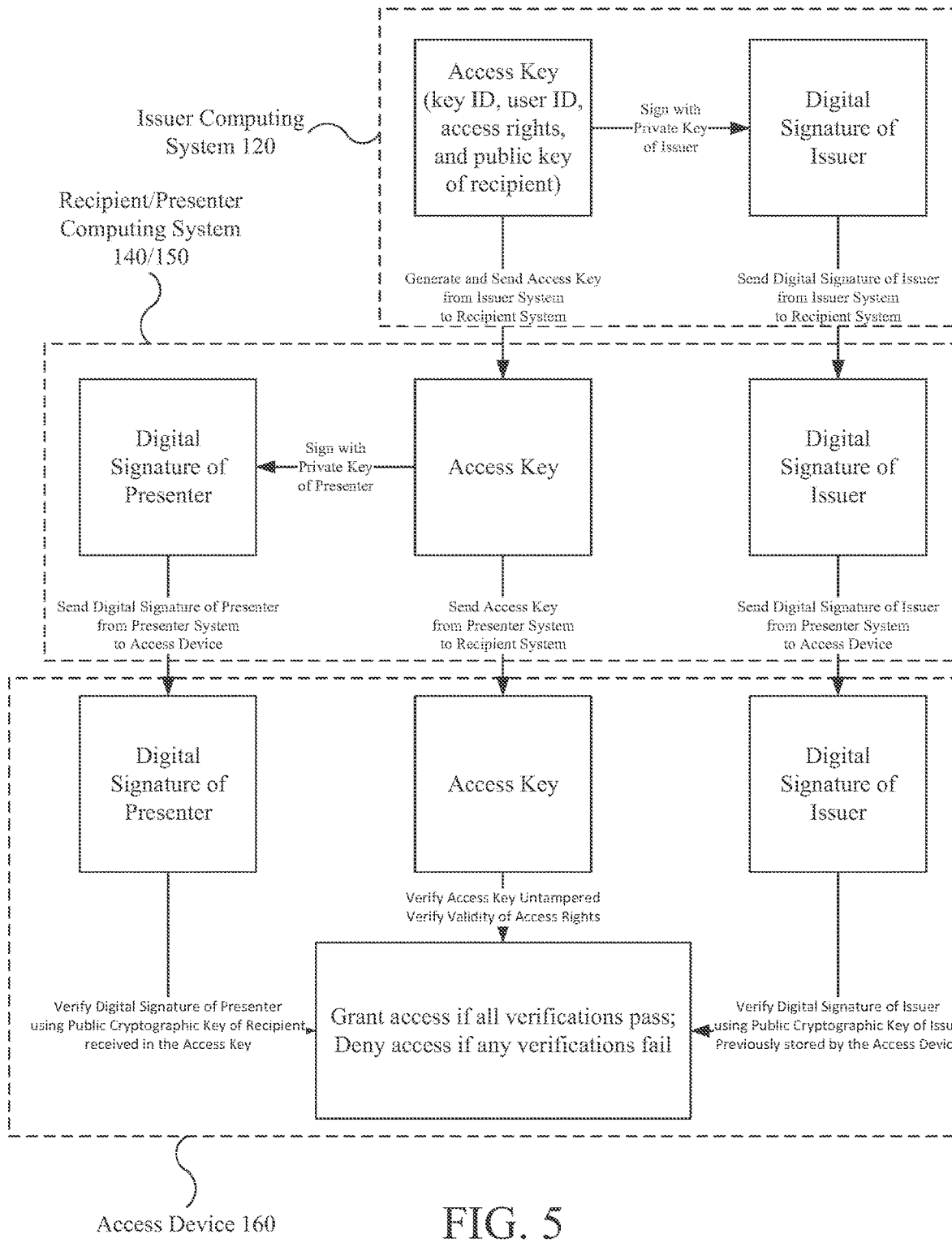
FIG. 5 is an operational diagram of the electronic access key system.
Figure 6:
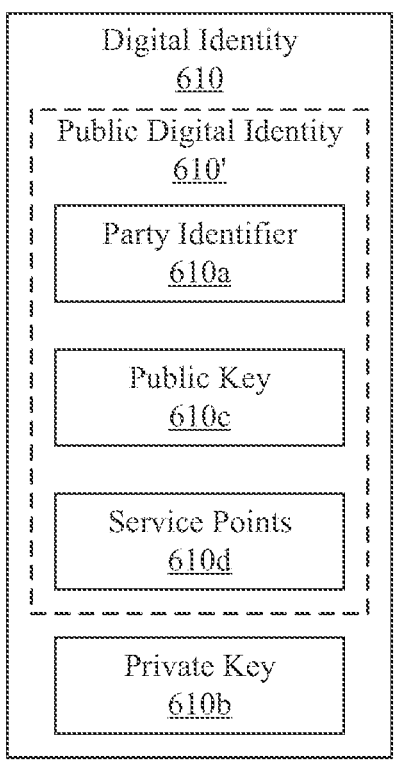
FIG. 6 is a schematic view of the information set of a digital identity of a party.
Figure 7:
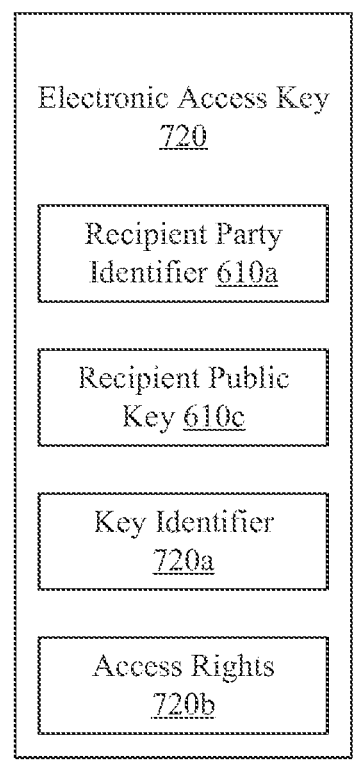
FIG. 7 is a schematic view of the information set of an electronic access key.

Referring to FIGS. 5-7, as referenced above, the electronic access key system 100 is configured to verify electronic access keys to provide recipients 14 access with the access device 160 to the physical space 16 by utilizing digital signatures and blockchain. As discussed in further detail below, the parties are each provided a cryptographic key pair that includes a private key and a public key. The digital signatures are generated using the private keys of the different parties and verified using public keys thereof. In issuing keys from the issuer 12 to the recipient 14, the user computing system 120 retrieves a public key of the recipient 14 from the blockhchain and digitally signs the electronic access key with their private key. In granting a presenter 15 access to the space 16, the access device 160 verifies digital signatures of the issuer 12 and the presenter 15 with the public keys thereof in order to verify the electronic access key presented by the presenter 15 is untampered and issued by the issuer 12 and that the presenter 15 is the recipient 14 of the electronic access key. The access device 160 further verifies the validity of the access rights of the electronic access key presented thereto.

As used herein digitally signing generally refers to producing a digital signature with a signing algorithm from the private key of the party signing and a set of information. As also used herein, verifying a digital signature generally refers to verifying the authenticity of the set of information (e.g., its source and/or integrity) with a signature verifying algorithm from the public key of the signing party and the set of information. In one example, the signing algorithm may include hashing the set of information with a hashing algorithm (e.g., SHA256) and encrypting the hash with the private key, while the signature verifying algorithm may include decrypting the hash with the public key, re-hashing the set of information, and comparing the decrypted hash with the re-hash. If the hash and the re-hash match, both the source and the integrity of the set of information are verified as being authentic (i.e., the set of information being both from the signing party and unaltered). As understood in the art, the private key and the public key of a party form a cryptographic key pair. For example, the generating and verifying of digital signatures may be performed using JavaScript Object Notation Web Signature ("JWS") methodology or any other suitable methodology.

Still referring to FIG. 5, as described in further detail below with respect to the method 800 and the submethods thereof, the electronic access key system 100 is configured for the issuer 12 to issue an electronic access key 620 to the recipient 14.

Referring also to FIG. 6, each party has a digital identity 610, which is a set of information associated with the party and includes a party identifier 610a, cryptographic key pair with a private key 610b and a public key 610c, and a service points 610d. The digital identity 610 is stored by the party computing system 110 (e.g., 120, 140, 150). The private key 610b is stored only by the party computing system 110, while the party identifier 610a, the public key 610c, and the service points 610d may be considered to form a public digital identity 610' that is stored in a blockchain by the blockchain computer system 184 and is accessible by other parties. The service points 610d include information for sending messages or other information to the recipient 14 associated with the digital identifier 610a, such as to the recipient computing system 140 associated therewith. Furthermore, the public key 610c of the issuer 12 is stored by the access devices 160 associated with the issuer 12. The set of information forming the digital identity 610 may be stored in any suitable format (e.g., a text file, JavaScript Object Notation or "JSON"). Further aspects of the digital identity 610 are discussed in further detail below.

Referring to FIG. 7, an electronic access key 720 is a set of information that defines permissions for the recipient 14 to access a given space 16. The electronic access key 720 generally includes the party identifier 610a of the recipient 14 to which the electronic access key 720 is issued, the public key 610c of the recipient 14, an access key identifier 720a, and the access rights 720b. The public key 610c of the recipient 14 is obtained from blockchain by the issuer 12 (e.g., the issuer computing system 120 or system). The access key identifier 720a is an identifier (e.g., alphanumeric code) that is uniquely associated with the electronic access key 720 and no other electronic access keys 720. The access rights information includes information identifying one or more of the spaces 16 and the timeframe to which the recipient 14 is being permitted access to the one or more spaces 16. The set of information forming the electronic access key 720 may be in any suitable format (e.g., JSON). More generally, the electronic access key 720 may be considered an attestation. An attestation is a set of information provided by a party functioning as an issuer 12 to another party functioning as a recipient 14, which may be digitally signed by the issuer 12 to assure the integrity and source of the information. It should be noted that the role of a party (e.g., as the issuer 12 or the recipient 14) may change depending on who is issuing the attestation, as was described previously. For example, a hotel operator and a guest of the hotel may function, respectively, as the issuer 12 and the recipient 14 with respect to the electronic access key 720, but may instead function, respectively, as the recipient 14 and the issuer 12 with respect to attestations from the guest to the hotel operator (e.g., personal identification information or stay preferences).

During a setup operation of the access device 160, the access device 160 may be associated with the issuer 12 and one or more of the spaces 16. For example, during the setup operation, the public key 610c of the issuer 12 is provided to and stored by the access device 160. The public key 610c of the issuer 12 associated with the access device may be stored thereby at other such times, which are also prior to presentation by a presenter 15 to the access device 160 of the electronic access key 720 issued for that same access device 160 or the one or more spaces 16 associated with the access device 160. As such, the access device 160 may verify the digital signature of the issuer 12 in the electronic access key 720 without retrieving or accessing the public key 610c of the issuer 12 when the presenter 15 seeks access to the space 16.

When issuing the electronic access key 720, the issuer 12 digitally signs and sends the electronic access key 720 with the issuer computing system 120 to the recipient 14 and, in particular, to the recipient computing system 140 associated therewith. The electronic access key is digitally signed by the issuer 12, as described above, with the private key 610b of the issuer 12.

When seeking access to one of the spaces 16, the presenter 15 with the presenter computing system 150 presents (e.g., sends) the electronic access key 720 and digital signature of the issuer 12 to the access device 160, along with a digital signature of the presenter 15. For example, the presenter computing system 150 may digitally sign the electronic access key 720 or other set of information.

When presented with the electronic access key 720, the digital signature of the issuer 12, and the digital signature of the presenter 15, the access device 160 verifies whether the electronic access key 720 is untampered and was issued by the issuer 12, whether the presenter 15 is the recipient 14 of the electronic access key 720, and validity of the access rights 720b (e.g., that the electronic access key 720 is unrevoked and is valid for the space 16 associated with the access device 160 and the current time).

To verify both that the electronic access key 720 is untampered and that the electronic access key 720 was issued by the issuer 12 associated with the access device 160, the access device 160 verifies the digital signature of the electronic access key 720, as described above, using the public key 610c of the issuer 12 previously stored thereby (e.g., during the setup operation of the access device 160 described previously). If the digital signature is verified, the electronic access key 720 is verified to both have been issued by the issuer 12 associated with the access device 160 and untampered (e.g., not altered after issuance). If the digital signature of the electronic access key 720 is not verified, either the electronic access key 720 was not issued by the issuer 12, was altered (relative to issuance), or both, and the access device 160 denies the presenter 15 access to the space 16.

To verify that the presenter 15 is the recipient 14 of the electronic access key 720, the access device 160 verifies the digital signature of the presenter 15, as described above, using the public key 610c of the recipient 14, which was received in the electronic access key 720 presented by the presenter 15. If the digital signature is verified, the presenter 15 is verified to be the recipient 14 of the electronic access key 720. If the digital signature of the presenter 15 is not verified, the access device 160 denies the presenter 15 access to the space 16.

To verify the validity of the access rights of the electronic access key 720, the access device 160 determines whether the electronic access key 720 has been revoked and whether the access rights are valid for the space 16 associated with the access device 160 and the current time. To determine whether the electronic access key 720 has been revoked, the access device 160 compares the electronic access key identifier 720a to a list of revoked keys. The list of revoked keys is periodically updated and sent to the access device 160 (e.g., as any of the electronic access keys 720 is revoked), and then stored locally by the access device 160 prior to subsequent presentation of the electronic access key 720 thereto. It is noted that, because the access device 160 is able to verify the authenticity of the electronic access key 720 presented thereto (e.g., using the public key 610c of the issuer 12 stored thereon), the access device 160 does not itself need to store access rights associated with those persons seeking access. If the electronic key 720 has been revoked, is not valid for the space 16, or is not valid for the current time, the access device 160 denies the presenter 15 access to the space 16.

If all verifications pass (i.e., digital signature of the issuer 12 is verified to authenticate the source and unaltered state of the electronic access key 720, the digital signature of the presenter 15 to verify that the presenter 15 is the recipient of the electronic access key 720, and that the electronic access key 720 is not revoked and is valid for the space 16 and current time), the lock 462 is operated (e.g., by the controller 222 of the access device 160) to provide the presenter 15 access to the space 16 (e.g., opening the lock 462). As referenced above, if any of the verifications fail, the access device 160 operates the lock 462 to deny access to the recipient 14 (e.g., keeps the lock 462 locked).

It should be noted that the access device 160, in a preferred embodiment of the electronic access key system 100, is configured to perform the verifications itself without any real-time communication with any other devices other than the presenter computing system 150 (e.g., the central computing system 182, the blockchain computing system 184, or the issuer computing systems 120). Limiting both the communication and processing performed by the access device 160 in this manner may be especially advantageous in circumstances where access devices 160 do not have an ongoing power supply (e.g., are battery-operated) and/or where network communications may be limited. In this manner, verifications, including identity verification, may performed by different ones of the access devices 160 without communicating with the central computing system 182 or other central device and, therefore, may be considered to be a decentralized system and/or perform the verification in a decentralized manner.

Other embodiments are contemplated, however. In one embodiment, the access device 160 communicates with the blockchain computing system 184 to retrieve the public key 610c of the recipient 14 of the electronic access key 720 in order to verify that the presenter 15 is the recipient 14 of the electronic access key 720. In another embodiment, the access device 160 transmits the electronic access key 720 and the digital signatures of the issuer 12 and the presenter 15 received therewith to another computing system (e.g., an on premises computing device), which then obtains the public keys 610c of the recipient 14 and/or the issuer 12 of the electronic access key 720 from the blockchain computing system 184, verifies the digital signatures and the access rights as described above, and sends instructions to the access device 160 to operate the lock 462 to permit or deny access.

Figure 8:
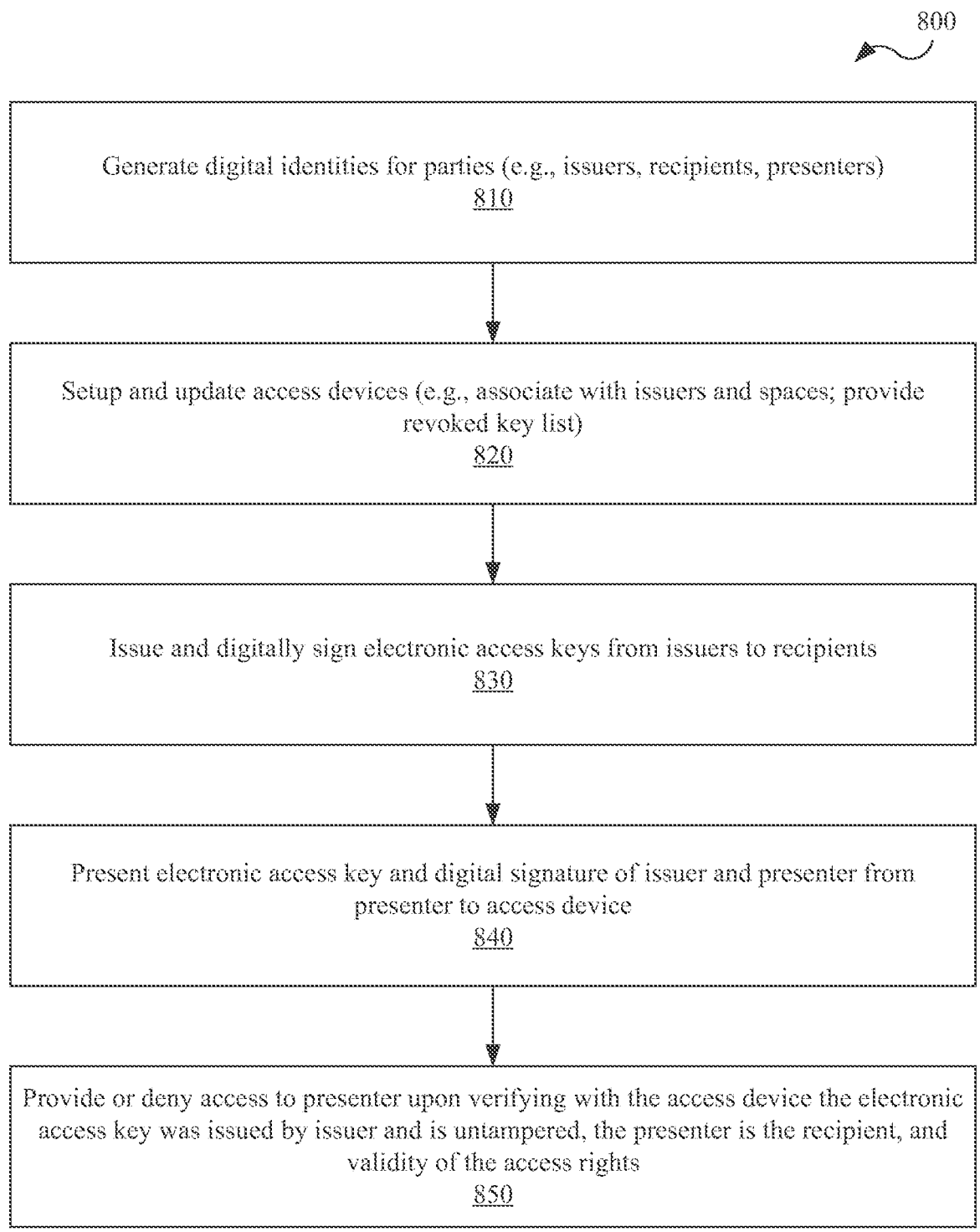
FIG. 8 is a flowchart of a method for operating the electronic access key system to provide or deny access to presenters.

Referring to FIG. 8, the electronic access key system 100 and the various computing devices and systems thereof are configured (e.g., include software or written instructions) that perform the method 800 for providing users access to physical spaces with electronic access keys. The method 800 generally includes generating 810 digital identities for the parties, setting up and updating 820 the access devices 160 with the issuers 12, issuing 830 and digitally signing electronic access keys 720 to recipients 14, presenting 840 the electronic access key 720 and digital signatures of issuer 12 and the presenter 15 to the access device 160, and providing or denying access 850 to the physical spaces 16 upon verifying with the access device 160 the authenticity of the electronic access key 720, that the presenter 15 is the recipient, and the access rights 720b.

Figure 9:
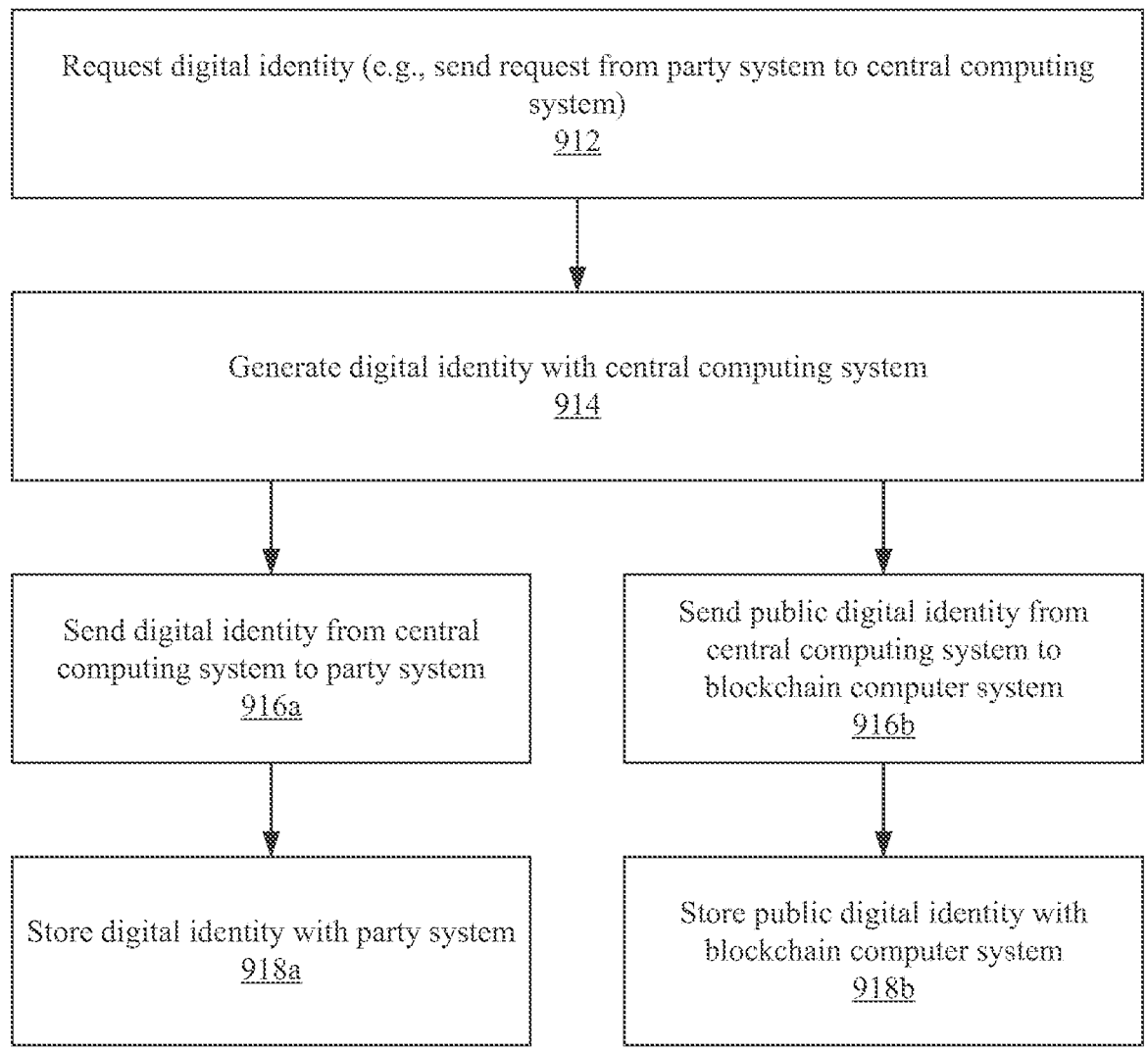
FIG. 9 is a flowchart of a submethod of the method of FIG. 8 for generating digital identities for parties.

Referring again to FIGS. 5 and 6 and also FIG. 9, as referenced above, the digital identity 610 digital identities are created for the parties, which may be performed according to the method 810.

The digital identity 610 generally includes the party identifier 610a, the private key 610b, the public key 610c, and one or more service points 610d that are assigned to and/or otherwise associated with the party. The party identifier 610a is a unique identifier assigned to the party, such as a numerical code (e.g., 16 digits). The private key 610b and the public key 610c form a key pair in which, as with digital signatures, the private key 610b is used for encryption (e.g., of a hash of a message) and the public key 610c is used for decryption. The private key 610b and the public key 610c may be generated according to any suitable cryptographic algorithm. The identifier 610a, the public key 610c, and the one or more service points 610d, but not the private key 610b, may be considered to cooperatively form a public digital identity 610'. The digital identity 610 is stored by the device of the respective party (e.g., 120, 140). The public digital identity 610' is stored in a blockchain by the blockchain computing system 184.

A party may request generation of the digital identity 610 with the party computing system 110 associated therewith, which may be at their own initiative or upon invitation (e.g., originating from an issuer 12). In response to the request, the central computing system 182 generates and sends the digital identity 610 to the party computing system 110.

Referring to FIG. 9, the submethod 810 is described for generating and storing digital identities 610 and public digital identities 610' for parties, which may include the issuers 12, the recipients 14, and the presenters 15, whether or not a recipient 14. The submethod 810 generally includes requesting 912, generating 914, sending 916, and storing 918 the digital identity 610.

The requesting 912 of the digital identity 610 is performed by the party computing system 110 associated with the party requesting the digital identity 610. For example, upon receiving an input from the party, the party computing system 110 sends a digital identity request to the central computing system 182. The digital identity request may include information about the requesting party, for example, service points 610d, which identify manners for communicating with the party and/or the party computing system 110, and/or personal identifying information (e.g., name, government identification number, date of birth). The personal identifying information may be used by the central computing system to verify the identity of the party (e.g., verifying with government databases), which may also provide an identity attestation (i.e., an attestation that the requesting party is the person or organization) that may be digitally signed by the identity verifying party (e.g., the government or another party).

The generating 914 of the digital identity 610 is performed by the central computing system 182 upon receiving the digital identity request from the party computing system 110. The generating 914 of the digital identity 610 generally includes generating the party identifier 610a to be unique from any other party identifiers 610a associated with other parties, and the key pair (i.e., the public and private keys 610b, 610c associated with each other) according to any suitable algorithms. The generating 914 of the digital identity 610 further includes generating or associating the service points 610d with the digital identity 610. The party identifier 610a, the private key 610b, the public key 610c, and the service points 610d form the set of information of the digital identity 610 and may be stored in any suitable file format (e.g., JSON, as referenced above).

The sending 916 of the digital identity 610 is performed by the central computing system 182. The sending 916 includes sending 916a the digital identity 610 to the party computing system 110 associated with the party for which the digital identity 610 was generated (e.g., according to the service points 610d of the digital identity 610 itself). The sending 916 also includes sending 916b the public digital identity 610' to the blockchain computing system 184 for storage thereby.

The storing 918 includes storing 918a the digital identity 610 of the party, including the private key 610b, by the party device 910. The digital identity 610 may be stored in a secure manner, for example, being encrypted and requiring input of a credential of the party (e.g., facial recognition, fingerprint recognition, or passcode) to the party device 910 to access or otherwise use the digital identity 610.

The storing 918b also includes storing 918b the public digital identity 610' of the party with the blockchain computing system 184 in one or more blockchains, as referenced above, by amending the blockchain consensus of the different nodes of the blockchain computing system 184 to amend the distributed ledger storing the digital identities 610 of different parties. The public digital identity 610' of the requesting party is publicly accessible in the blockchain (i.e., by others than the party with which the public digital identity 610' is associated) to allow retrieval of the public key 910b associated therewith (e.g., when issuing electronic access keys 720).

Figure 10:
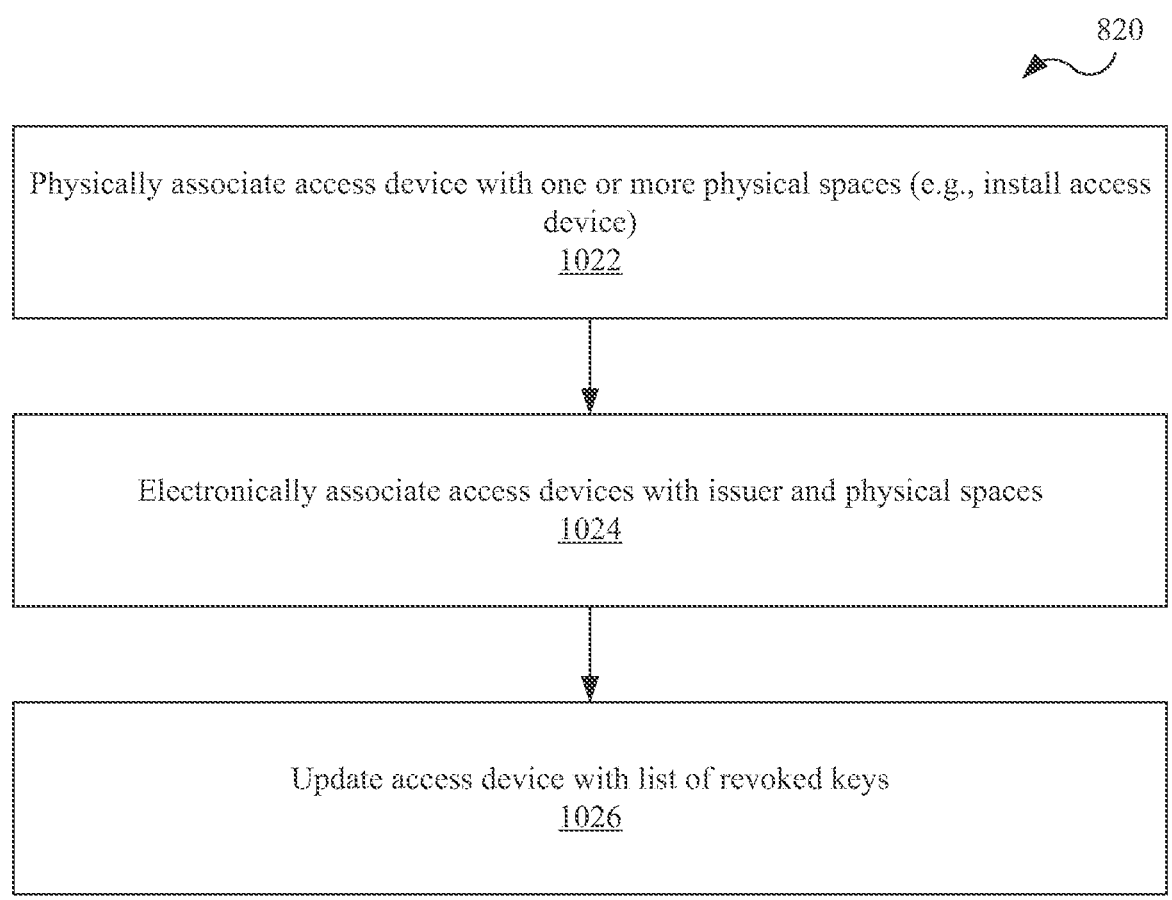
FIG. 10 is a flowchart of a submethod of the method of FIG. 8 for setting up and updating access devices.

Referring to FIG. 10, as referenced above, the access devices 160 are set up and updated 820. The setting up and updating 820 generally includes physically associating 1022 the access device 160 with one or more physical spaces 16, electronically associating 1024 the access device with the issuer 12 and the one more physical spaces 16, and updating 1026 lists of revoked electronic access keys 720. The physically associating 1022 includes installing the access device 160 to the one or more physical spaces 16 (e.g., to a door that provides access to the physical space 16). The electronic associating 1024 includes storing, with the access device 160, the public key 610c of the issuer 12 and information identifying the physical spaces 16 physically associated with the access device 160. The updating 1026 includes generating and sending to the access device 160 and storing thereon listings up electronic access keys 720 that have been revoked. For example, the issuer 12 may revoke access rights to a particular physical space 16 from a recipient 14 in which case the recipient may still store and present the electronic access key 720 previously received but when presented to the access device 160 is identified as a revoked electronic access key 720. It should be noted that if access is revoked from one of multiple spaces, a new electronic access key 720 may be issued to the other physical spaces 16 to which the recipient 14 may still be granted access.

Figure 11:
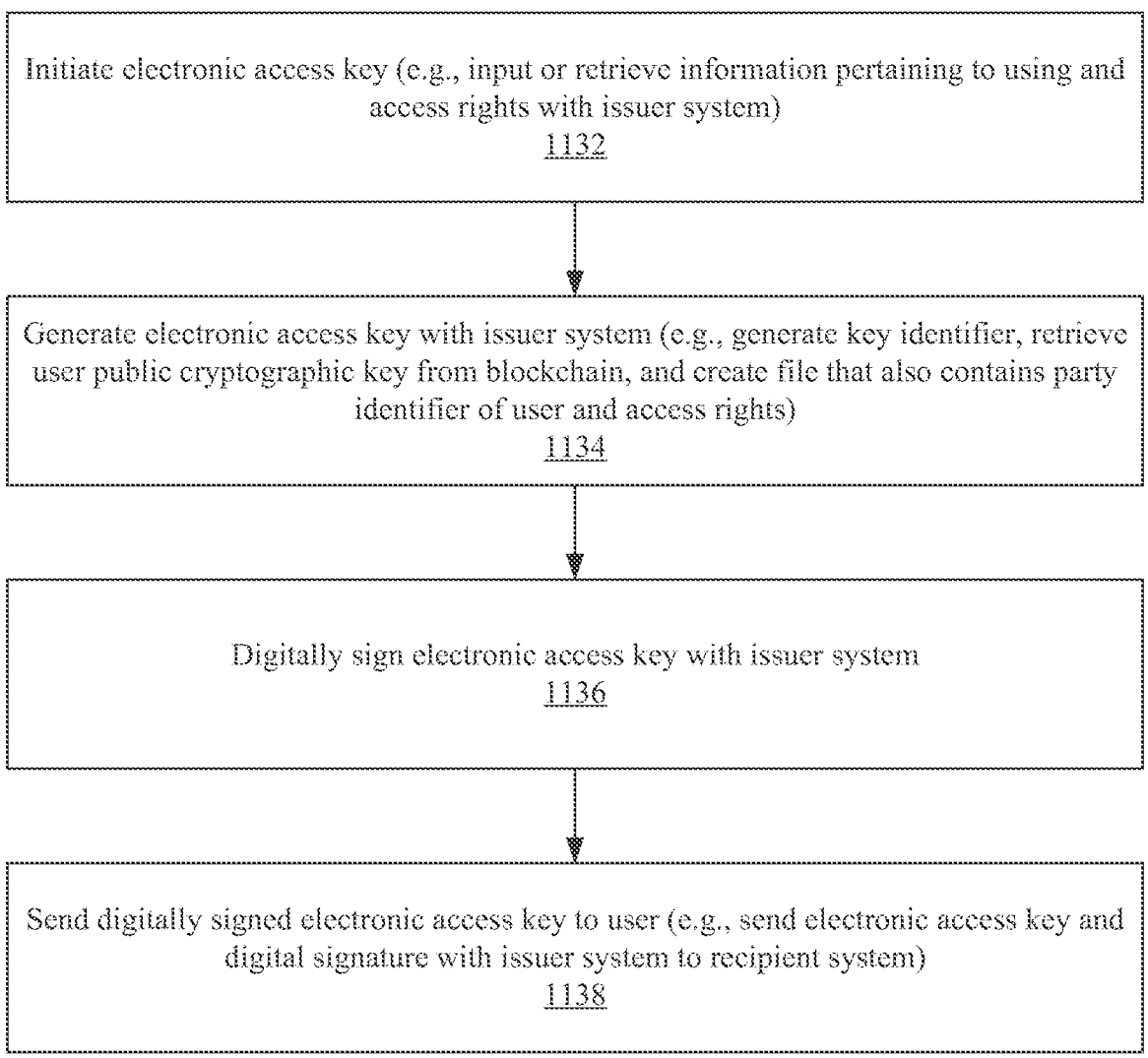
FIG. 11 is a flowchart of a submethod of the method of FIG. 8 for issuing electronic access keys.

Referring again to FIGS. 5 and 7 and also FIG. 11, as referenced above, the electronic access keys 720 are issued by the issuer 12 with the issuer computing system 120, which may be performed according to the method 830.

As shown in FIG. 7, the electronic access key 720 is a set of information issued by the issuer 12 to the recipient 14 that authorizes the recipient 14 access to the physical space 16. As reference above, the electronic access key 720 generally includes the key identifier 720a, the access rights 720b, the party identifier 610a of the recipient 14 of the electronic access key 720, and the public key 610c of the recipient 14.

The key identifier 720*a* is a unique identifier (e.g., numeric or alphanumeric code) that is associated with the electronic access key 720 and no other electronic access keys 720. The access rights 720*b* include suitable information for identifying the permissions granted, which may generally include an identifier of the space 16 (e.g., an identifier of the space 16 itself of the access device 160 associated with the space 16) and a timeframe in which the recipient 14 is being authorized to access the space 16 (e.g., starting date and time).

The electronic access key 720 may be requested by the issuer 12 with the issuer computing system 120, for example, when processing hotel reservation information for the recipient 14. As part of the electronic access key request, the issuer 12 inputs suitable information for sending the electronic access key 720 to the recipient 14, which may include the service points 610*d* of the recipient 14, the party identifier 610*a* of the recipient 14 by which the service points 610*d* from the public digital identity 610' stored in the blockchain, and/or other personal identifying information (e.g., name, contact information). In response to the request, the issuer computing system 120 generates, digitally signs, and sends the electronic access key 720 to the recipient computing system 140 of the recipient 14 with which the electronic access key 720 is associated, along with the digital signature.

Referring to FIG. 11, the submethod of issuing 830 a signed electronic access key 720 to the recipient 14, generally includes initiating 1132, generating 1134, signing 1136, and sending 1138 the electronic access key 720.

The initiating 1132 of the electronic access key 720 is performed, for example, by the issuer 12 with the issuer computing system 120, which includes inputting information pertaining the recipient 14 and the access rights 720*b*. The information pertaining to the recipient 14 is suitable to ensure the electronic access key 720 is sent to the recipient 14 and may include, for example, the party identifier 610*a*, the service points 610*d*, and/or personal identifying information of the presenter 714 (e.g., name, date of birth, contact information). As referenced above, the access rights 720*b* include the identifier of the space 16 and the timeframe in which the recipient 14 is authorized to access the space 16.

The generating 1134 of the electronic access key 720 is performed by the issuer computing system 120, which obtains the public key 610*c* from the public digital identity 610' stored in the blockchain (e.g., requests and receives the public key 610*c* for the party identifier 610*a* from the blockchain computing system 184) and generates the key identifier 720*a*. The issuer computing system 120 then stores the set of information of the electronic access key 720 into a suitable file format (e.g., JSON, as referenced above), including the party identifier 610*a* of the recipient 14, the public key 610*c* of the recipient 14, the key identifier 720*a* and the access rights 720*b*.

The signing 1136 of the electronic access key 720 is performed by the issuer computing system 120, as described above, by generating a digital signature using a signing algorithm from the electronic access key 720 and the private key 610*b* of the issuer 12.

The sending 1138 of the electronic access key 720, includes sending the electronic access key 720 and the digital signature with the issuer computing system 120 to the recipient computing system 140. The combination of the electronic access key 720 and the digital signature by the issuer 12 may be referred to as a digitally signed access key.

Figure 12:
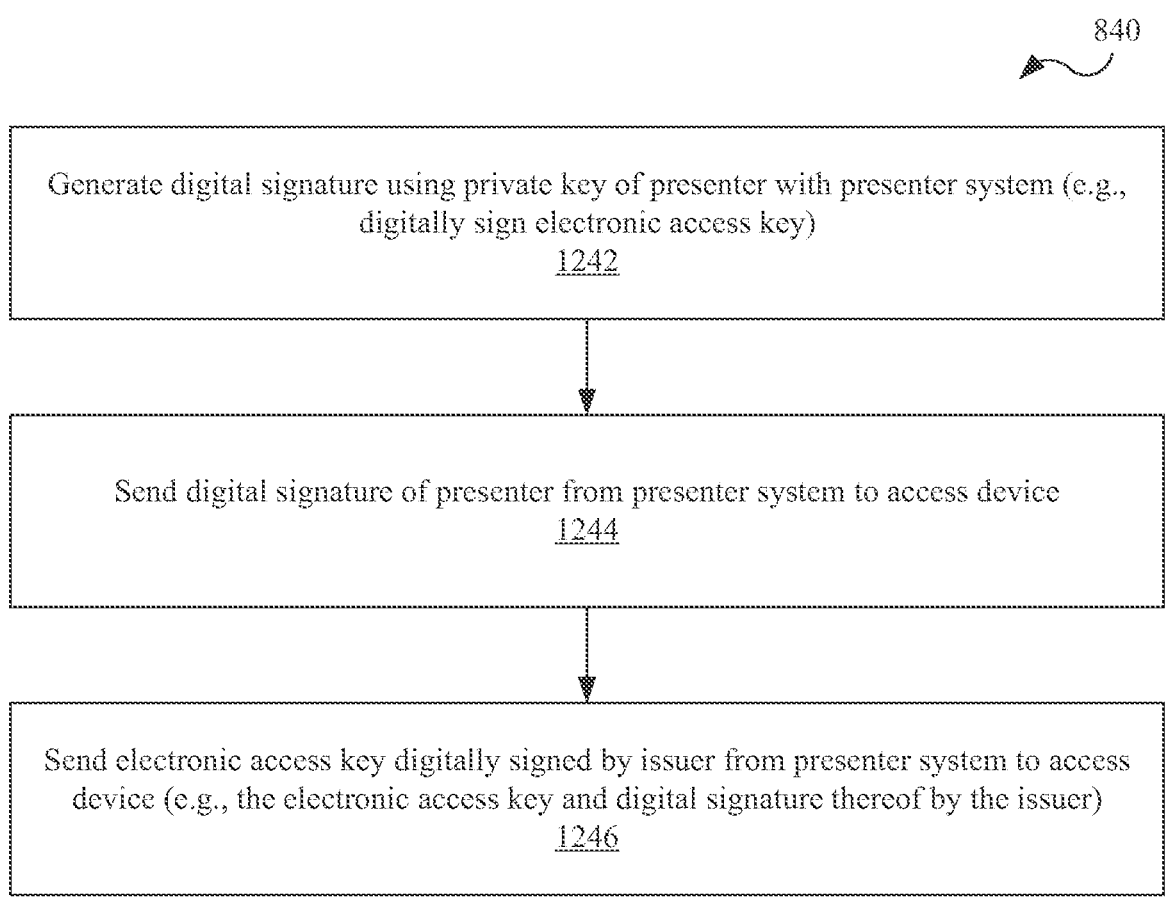
FIG. 12 is a flowchart of a submethod of the method of FIG. 8 for presenting electronic access keys to the access devices.

Referring to again to FIG. 5 and also FIG. 12, when the recipient 14 seeks access to the physical space 16, the recipient computing system 140 presents the digitally signed electronic access key 720 (e.g. the electronic access key 720 and the digital signature of the issuer 12) and a digital signature of the presenter 15 to the access device 160 associated with the physical space 16. The presenter computing system 150 sends the digitally sends the electronic access key 720, the digital signature thereof of the issuer 12, and the digital signature of the presenter 15 to the access device 160 via any suitable wireless communications protocol (e.g., Bluetooth, Wi-Fi, near-field communication (NFC)). The digitally signed key is as described previously (i.e., including the electronic access key 720 and the digital signature thereof). The digital signature of the presenter 15 may be made in relation, for example, to the electronic access key 720 or other information.

Referring to FIG. 12, the submethod of presenting 840 a signed electronic access key 720 generally includes generating 1242 a digital signature of the presenter 15 with the presenter computing system 150, sending 1244 the signature of the presenter 15, and sending 1246 the electronic access key 720 and the digital signature thereof by the issuer 12.

The generating 1242 of the digital signature of the presenter 15 is performed by the presenter computing system 150 with the private key 610*b* of the presenter 15 and may be performed, as described above, with respect to the electronic access key 720 or other information.

The sending 1244 digital signature of the presenter 15 and the sending 1246 of the electronic access key 720 and the digital signature thereof by the issuer 12 is performed with the presenter computing system 150 using any suitable wireless communication protocol (e.g., via Bluetooth, Wi-Fi, NFC, or other suitable communications protocol) when the presenter 15 seeks access to the space 16 and, thereby, is in relatively close proximity to the access device 160 (e.g., can place the presenter computing system 150 within a few inches of the access device 160).

Figure 13:
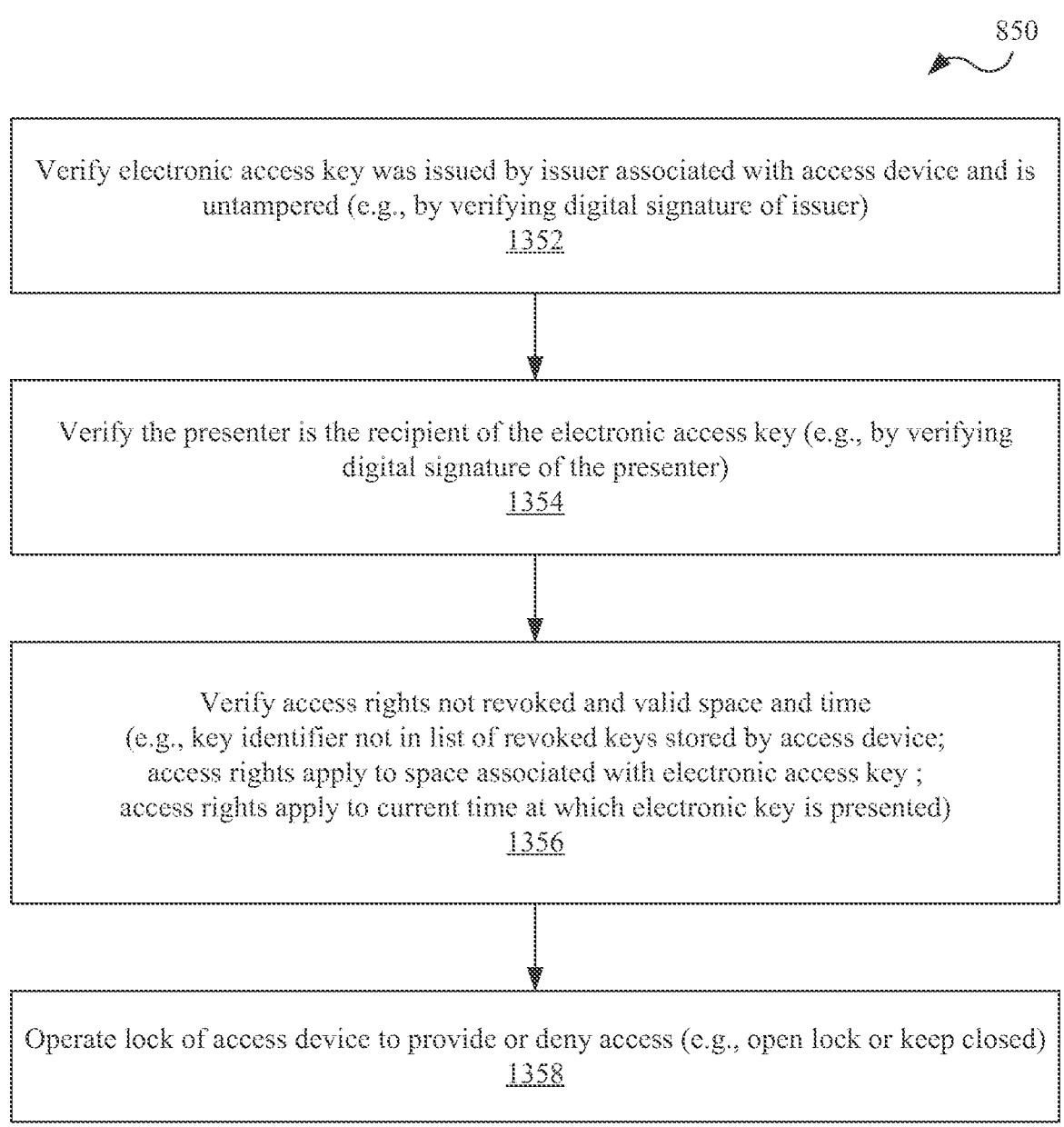
FIG. 13 is a flowchart of a submethod of the method of FIG. 8 for verifying the electronic access key, the presenter, and the access rights thereof.

Referring again to FIG. 5 and also to FIG. 13, when the access device 160 receives the digitally signed electronic access key 720 (e.g., the electronic access key 720 and the digital signature thereof by the issuer 12) and the digital signature of the presenter 15, the access device 160 verifies the digital signature of the issuer 12 to verify that the electronic access key 720 is untampered and issued by the issuer 12, verifies the digital signature of the recipient 14 to verify that the presenter 15 is the recipient 14 of the electronic access key 720, and verifies the validity of the access rights 720*b*. The public key 610*c* of the issuer 12, which was previously stored by the access device 160, is used to verify that the digital signature of the issuer 12. The public key 610*c* of the recipient 14, which was received in the electronic access key 720, is used to verify the digital signature of the presenter 15.

Referring to FIG. 13, the method of providing or denying 850 access to the presenter 15 is performed by the access device 160 and generally includes verifying 1352 that the electronic access key 720 is not tampered and cryptographically signed electronic access key 720, verifying 1354 that the presenter 15 is the recipient 14, verifying 1356 that the access rights are valid, and operating 1358 the lock 462 to provide or deny access to the recipient 14 according to the verifying 1352, 1354, 1356. While the steps of verifying 1352, 1354, 1356 and the substeps thereof are depicted as occurring in order, it should be understood that they may be performed in any suitable sequence (e.g., in different orders and/or in parallel).

The verifying 1352 that the electronic access key 720 was issued by the issuer 12 and is untampered is performed by verifying the digital signature by the issuer 12 thereof with the access device 160, as described above, using the public key 610c of the issuer stored on the access device 160. Alternatively, the verifying 1352 may be described as verifying the digital signature by the issuer 12 of the electronic access key 720, which is again performed using the public key 610c of the issuer previously stored on the access device 160.

The verifying 1354 that the presenter 15 is the recipient 14 generally includes verifying the digital signature of the presenter 15, which is performed by the access device 160, as described above, using the public key 610c of the recipient 14 received as part of the electronic access key 720. Alternatively, the verifying 1354 may be described as verifying the digital signature by the presenter 15.

The verifying 1356 of the validity of the access rights 720b of the electronic access key 720 includes verifying that the electronic access key 720 has not been revoked, the access rights apply to the space 16 associated with the access device 160, and the access rights are valid for the current time. In verifying that the electronic access key 720 has not been revoked, the access device 160 compares the key identifier 720a to key identifiers in a revocation list stored by the access device 160 and received from the issuer computing system 120. In verifying that the access rights 720b are associated with the space 16, the space 16 identified in the access rights 720b is compared to the identified space stored by the access device 160 (e.g., comparing identifiers of the space 16 in the electronic access key 720 and the access device 160).

The operating 1358 of the lock 462 to permit or deny access includes opening the lock if the presenter 15 is verified to be the recipient 14 of the electronic access key 720 being presented, the non-tampering and source of the electronic access key 720, and the access rights 720b are all verified. If any are not verified, the lock 462 is operated (e.g., kept locked) to prevent the presenter 15 access to the space 16.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electronic access key system comprising:
    an electronic door lock configured to receive an electronic access key from a presenter computing system of a presenter and control access to a physical space;
    wherein the electronic access key was previously digitally signed by an issuer computing system of an issuer associated with the electronic door lock by generating a digital signature using a private key of the issuer, the private key being of a cryptographic key pair that also includes a public key; and
    wherein the electronic door lock stores the public key of the issuer associated therewith prior to receiving the electronic access key from the presenter computing system, and upon receiving the electronic access key, verifies the electronic access key with the public key of the issuer and denies the presenter access to the physical space if the electronic access key is not verified;
    wherein the electronic access key was previously issued to a recipient having another public key, and the electronic door lock further verifies that the presenter of the electronic access key is the recipient with the public key of the recipient and denies the presenter access to the physical space if the presenter is not verified to be the recipient;
    wherein the presenter has another private key, and the presenter computing system generates a digital signature of the presenter with the private key of the presenter and sends the digital signature of the presenter to the electronic door lock; and
    wherein the electronic door lock received from the presenter computing system the digital signature of the presenter, the electronic access key includes the public key of the recipient, and the electronic door lock verifies that the presenter is the recipient by verifying the digital signature of the presenter with the public key of the recipient.

2. The electronic access key system according to claim 1, further comprising a blockchain computing system, the issuer computing system associated with the issuer, and the presenter computing system;
    wherein the electronic door lock verifies the electronic access key by verifying with the public key of the issuer that the electronic access key was digitally signed with the private key of the issuer to, thereby, verify that the electronic access key was issued by the issuer associated with the electronic door lock and is untampered, and wherein the electronic access key was previously issued to a recipient having another public key, and the electronic door lock further verifies that the presenter of the electronic access key is the recipient with the public key of the recipient and denies the presenter access to the physical space if the presenter is not verified to be the recipient;
    wherein the presenter has another private key, and the presenter computing system generates a digital signature of the presenter with the private key of the presenter and sends the digital signature of the presenter to the electronic door lock, wherein the electronic door lock received from the presenter computing system the digital signature of the presenter, the electronic access key includes the public key of the recipient, and the electronic door lock verifies that the presenter is the recipient by verifying the digital signature of the presenter with the public key of the recipient;
    wherein the electronic access key includes a key identifier uniquely associated with the electronic access key, the electronic door lock stores prior to receiving the electronic access key a list of revoked key identifiers associated with other electronic access keys that have been revoked by the issuer, the electronic door lock verifies that the electronic access key has not been revoked by the issuer by comparing the key identifier of the electronic access key to the list of revoked key identifiers, and the electronic door lock denies the presenter access to the physical space if the electronic access key is not verified to have not been revoked;
    wherein the electronic access key includes access rights that includes an identified physical space and a timeframe in which a recipient of the electronic access key is permitted to access the physical space, and the electronic door lock denies the presenter access to the physical space if one or both of the identified physical space does not match the physical space associated with the electronic door lock or the timeframe does not include a current time; and wherein the issuer has a digital identity that is a set of information that includes a party identifier, the private key, and the public key that forms the cryptographic key pair with the private key and also have a public digital identity that includes the party identifier and the public key;

wherein the presenter has another digital identity that is another set of information that includes another party identifier, another private key, and another public key that forms another cryptographic key pair with the other private key and also has another public digital identity that includes the other party identifier and the other public key; and wherein the blockchain computing system stores in a blockchain the public digital identities of the issuer and the presenter, and the blockchain is accessible by the issuer computing system.

3. The electronic access key system according to claim 1, wherein the electronic door lock verifies the electronic access key by verifying with the public key of the issuer that the electronic access key was digitally signed with the private key of the issuer.

4. The electronic access key system according to claim 3, wherein the electronic door lock verifies the digital signature of the electronic access key to verify that the electronic access key was issued by the issuer associated with the electronic door lock and is untampered.

5. The electronic access key system according to claim 1, wherein the presenter is verified to be the recipient if the other private key of the presenter and the other public key of the recipient form another cryptographic key pair of the recipient.

6. The electronic access key system according to claim 1, wherein the electronic access key includes a key identifier uniquely associated with the electronic access key, the electronic door lock stores prior to receiving the electronic access key a list of revoked key identifiers associated with other electronic access keys that have been revoked by the issuer, the electronic door lock verifies that the electronic access key has not been revoked by the issuer by comparing the key identifier of the electronic access key to the list of revoked key identifiers, and the electronic door lock denies the presenter access to the physical space if the electronic access key is not verified to have not been revoked.

7. The electronic access key system according to claim 1, wherein the electronic access key includes access rights that includes an identified physical space and a timeframe in which a recipient of the electronic access key is permitted to access the physical space, and the electronic door lock denies the presenter access to the physical space if one or both of the identified physical space does not match the physical space associated with the electronic door lock or the timeframe does not include a current time.

8. The electronic access key system according to claim 1, further comprising a blockchain computing system, the issuer computing system associated with the issuer, and the presenter computing system;

wherein the issuer has a digital identity that is a set of information that includes a party identifier, the private key, and the public key that forms the cryptographic key pair with the private key and also have a public digital identity that includes the party identifier and the public key;

wherein the presenter has another digital identity that is another set of information that includes another party identifier, another private key, and another public key that forms another cryptographic key pair with the other private key and also has another public digital identity that includes the other party identifier and the other public key; and wherein the blockchain computing system stores in a blockchain the public digital identity of the issuer and the other digital identity of the presenter, and the blockchain is accessible by the issuer computing system.

9. The electronic access key system according to claim 1, wherein the electronic door lock controls an electronically-operated lock physically associated with hardware that prevents access to the physical space when locked and permits access to the physical space when unlocked.

10. An electronic access key system comprising:
an access device configured to receive an electronic access key from a presenter computing system of a presenter and control access to a physical space; and
a blockchain computing system, the issuer computing system being associated with the issuer, and the presenter computing system;
wherein the electronic access key was previously digitally signed by an issuer computing system of an issuer associated with the access device by generating a digital signature using a private key of the issuer, the private key being of a cryptographic key pair that also includes a public key;
wherein the access device stores the public key of the issuer associated therewith prior to receiving the electronic access key from the presenter computing system, and upon receiving the electronic access key, verifies the electronic access key with the public key of the issuer and denies the presenter access to the physical space if the electronic access key is not verified;
wherein the access device verifies the electronic access key by verifying with the public key of the issuer that the electronic access key was digitally signed with the private key of the issuer to, thereby, verify that the electronic access key was issued by the issuer associated with the access device and is untampered, and wherein the electronic access key was previously issued to a recipient having another public key, and the access device further verifies that the presenter of the electronic access key is the recipient with the public key of the recipient and denies the presenter access to the physical space if the presenter is not verified to be the recipient;
wherein the presenter has another private key, and the presenter computing system generates a digital signature of the presenter with the private key of the presenter and sends the digital signature of the presenter to the access device, wherein the access device received from the presenter computing system the digital signature of the presenter, the electronic access key includes the public key of the recipient, and the access device verifies that the presenter is the recipient by verifying the digital signature of the presenter with the public key of the recipient;
wherein the electronic access key includes a key identifier uniquely associated with the electronic access key, the access device stores prior to receiving the electronic access key a list of revoked key identifiers associated with other electronic access keys that have been revoked by the issuer, the access device verifies that the electronic access key has not been revoked by the issuer by comparing the key identifier of the electronic access key to the list of revoked key identifiers, and the access device denies the presenter access to the physical space if the electronic access key is not verified to have not been revoked;

wherein the electronic access key includes access rights that includes an identified physical space and a timeframe in which a recipient of the electronic access key is permitted to access the physical space, and the access device denies the presenter access to the physical space if one or both of the identified physical space does not match the physical space associated with the access device or the timeframe does not include a current time; and wherein the issuer has a digital identity that is a set of information that includes a party identifier, the private key, and the public key that forms the cryptographic key pair with the private key and also have a public digital identity that includes the party identifier and the public key;

wherein the presenter has another digital identity that is another set of information that includes another party identifier, another private key, and another public key that forms another cryptographic key pair with the other private key and also has another public digital identity that includes the other party identifier and the other public key; and wherein the blockchain computing system stores in a blockchain the public digital identities of the issuer and the presenter, and the blockchain is accessible by the issuer computing system.

11. An electronic access key system comprising:

an electronic door lock configured to receive an electronic access key from a presenter computing system of a presenter and control access to a physical space; and a blockchain computing system, the issuer computing system being associated with the issuer, and the presenter computing system;

wherein the electronic access key was previously digitally signed by an issuer computing system of an issuer associated with the electronic door lock by generating a digital signature using a private key of the issuer, the private key being of a cryptographic key pair that also includes a public key;

wherein the electronic door lock stores the public key of the issuer associated therewith prior to receiving the electronic access key from the presenter computing system, and upon receiving the electronic access key, verifies the electronic access key with the public key of the issuer and denies the presenter access to the physical space if the electronic access key is not verified;

wherein the electronic door lock verifies the electronic access key by verifying with the public key of the issuer that the electronic access key was digitally signed with the private key of the issuer to, thereby, verify that the electronic access key was issued by the issuer associated with the electronic door lock and is untampered, and wherein the electronic access key was previously issued to a recipient having another public key, and the electronic door lock further verifies that the presenter of the electronic access key is the recipient with the public key of the recipient and denies the presenter access to the physical space if the presenter is not verified to be the recipient;

wherein the presenter has another private key, and the presenter computing system generates a digital signature of the presenter with the private key of the presenter and sends the digital signature of the presenter to the electronic door lock, wherein the electronic door lock received from the presenter computing system the digital signature of the presenter, the electronic access key includes the public key of the recipient, and the electronic door lock verifies that the presenter is the recipient by verifying the digital signature of the presenter with the public key of the recipient;

wherein the electronic access key includes a key identifier uniquely associated with the electronic access key, the electronic door lock stores prior to receiving the electronic access key a list of revoked key identifiers associated with other electronic access keys that have been revoked by the issuer, the electronic door lock verifies that the electronic access key has not been revoked by the issuer by comparing the key identifier of the electronic access key to the list of revoked key identifiers, and the electronic door lock denies the presenter access to the physical space if the electronic access key is not verified to have not been revoked;

wherein the electronic access key includes access rights that includes an identified physical space and a timeframe in which a recipient of the electronic access key is permitted to access the physical space, and the electronic door lock denies the presenter access to the physical space if one or both of the identified physical space does not match the physical space associated with the electronic door lock or the timeframe does not include a current time; and wherein the issuer has a digital identity that is a set of information that includes a party identifier, the private key, and the public key that forms the cryptographic key pair with the private key and also have a public digital identity that includes the party identifier and the public key;

wherein the presenter has another digital identity that is another set of information that includes another party identifier, another private key, and another public key that forms another cryptographic key pair with the other private key and also has another public digital identity that includes the other party identifier and the other public key; and wherein the blockchain computing system stores in a blockchain the public digital identities of the issuer and the presenter, and the blockchain is accessible by the issuer computing system.

* * * * *